United States Patent [19]

Osuna-Diaz

[11] 4,161,386
[45] Jul. 17, 1979

[54] NOZZLE FOR INJECTION MOLDING MACHINES

[75] Inventor: Jesus M. Osuna-Diaz, Rochester, Mich.

[73] Assignee: Incoe Corporation, Troy, Mich.

[21] Appl. No.: 862,101

[22] Filed: Dec. 19, 1977

[51] Int. Cl.² .............................................. B29F 1/00
[52] U.S. Cl. .................................. 425/549; 239/133; 425/547
[58] Field of Search ....................... 425/549, 547, 548; 239/600, 601, 132, 133, 135; 264/329

[56] References Cited

U.S. PATENT DOCUMENTS

| 2,911,680 | 11/1959 | Kelly | 425/548 X |
| 3,189,948 | 6/1965 | Whitney | 425/548 X |
| 3,499,189 | 3/1970 | Perras | 425/548 X |
| 3,800,027 | 3/1974 | Tsutsumi | 425/547 X |
| 3,822,856 | 7/1974 | Gellert | 425/549 X |
| 4,033,485 | 7/1977 | Kohler | 425/548 X |

FOREIGN PATENT DOCUMENTS

| 2542162 | 4/1976 | Fed. Rep. of Germany | 425/549 |
| 427219 | 12/1966 | Switzerland | 239/133 |

Primary Examiner—William R. Briggs
Attorney, Agent, or Firm—Harness, Dickey & Pierce

[57] ABSTRACT

An internally heated injection molding machine nozzle which permits heater removal and replacement without the necessity of removing the nozzle from the mold. The nozzle also reduces inventory requirements by having interchangeable components. The nozzle comprises a shank housing with interchangeable shanks and bodies mounted at the forward end and a removable cap at the rearward end together with a heater retaining plug. The heater may be removed from the rear merely by removing the cap and plug while the nozzle is still mounted in the mold.

12 Claims, 6 Drawing Figures

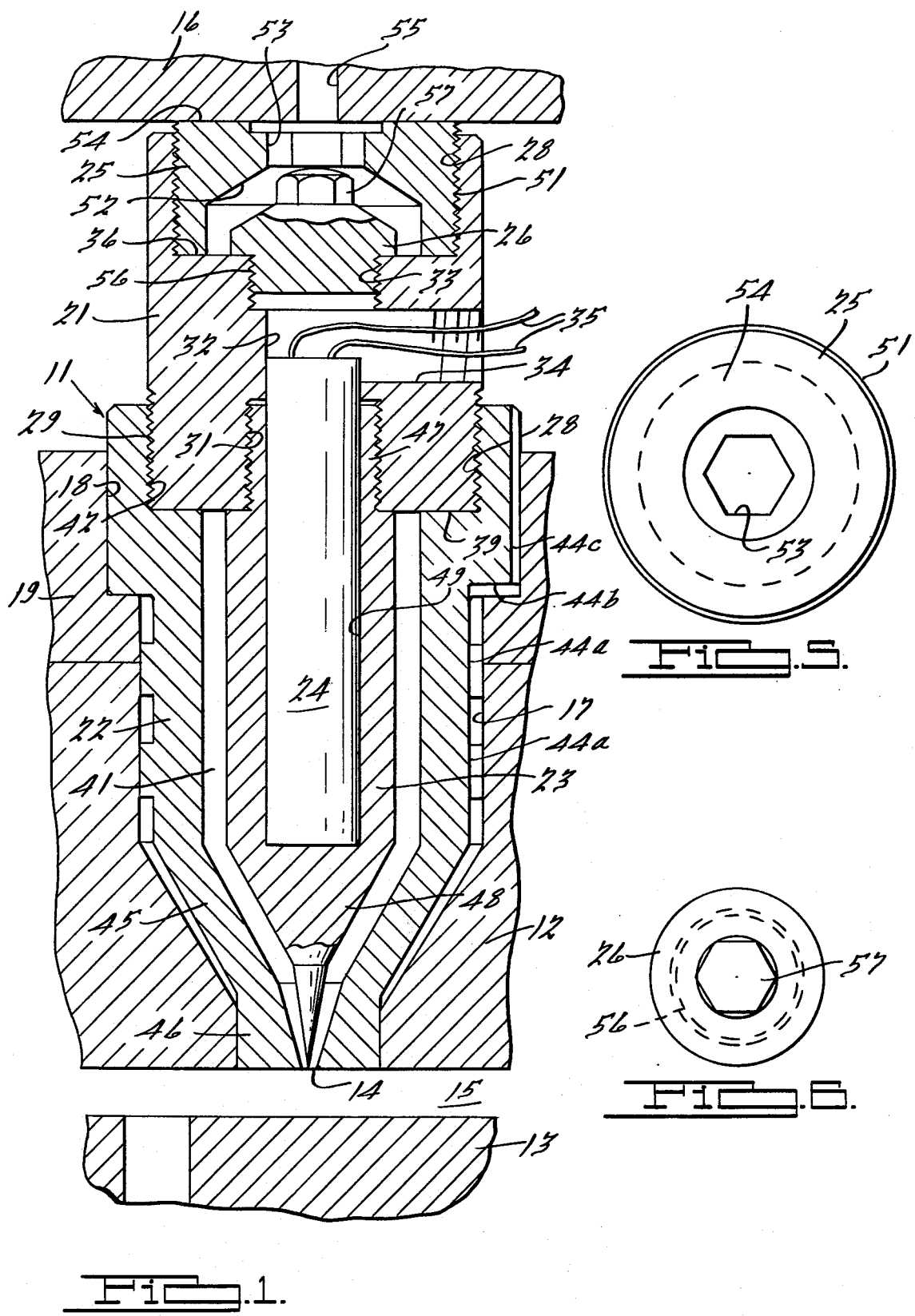

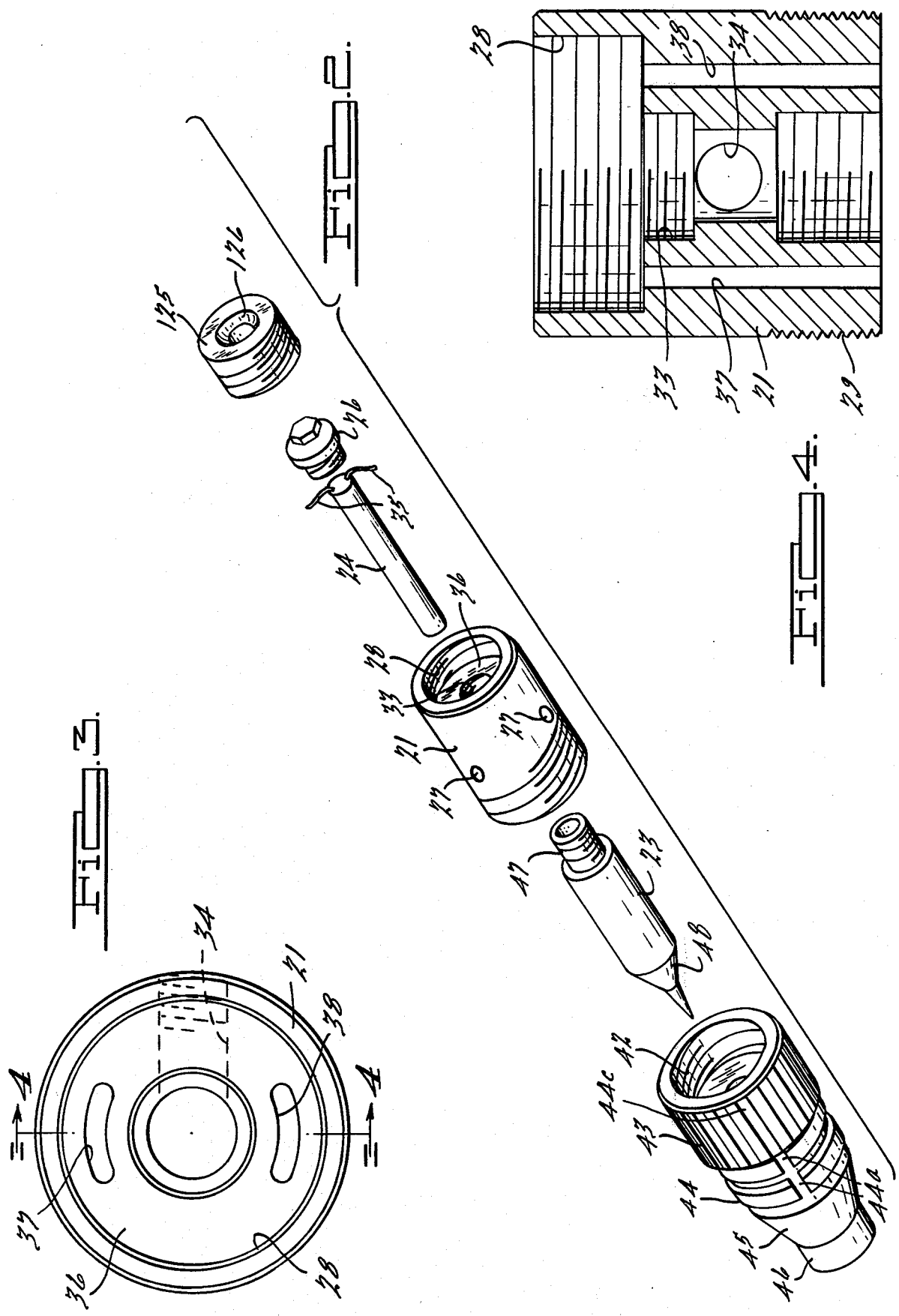

NOZZLE FOR INJECTION MOLDING MACHINES

BACKGROUND OF THE INVENTION

1. Field of the Invention

The invention relates to machines for plastic injection molding and more particularly to nozzles mounted in the molds of such machines which have internal heaters which maintain the plastic at the discharge end of the nozzle in a plasticized condition.

2. Description of the Prior Art

Gilmore Pat. No. 3,010,155 and Seres Pat. No. 3,707,265 show nozzles of this general type. The nozzles are supplied with the molten plastic either by a manifold or a machine nozzle having a spherical tip. The conventional nozzle has passageway means from its rearward end to the tip or discharge end, this means being formed between an inner shank and an outer body, the heater being disposed within the shank. The shank in this conventional construction is integral with a shank housing carried by the mold. A tapered spreader member is silver-soldered to the forward end of the shank to form the annular converging passage leading to the discharge orifice of the nozzle.

If it is required in such a conventional nozzle to replace the heater, it is necessary to first remove the entire nozzle from the mold, then remove the outer body from the shank housing, and melt the silver-solder so that the spreader member may be removed from the shank. After the spreader member is removed, there will be access to the heater which is extracted from the forward end of the shank. This is a time consuming and expensive process.

Another disadvantage of the conventional nozzle as exemplified by the above mentioned patents, is the fact that each nozzle will only be usable in a certain size of mold. Since most molds differ in size, it has been necessary in the past for the manufacturer to stock many different sizes of nozzles so that they could be mounted in the different molds.

BRIEF SUMMARY OF THE INVENTION

It is an object of the present invention to provide a novel and improved internally heated nozzle for molding machines which enables the heater to be removed and replaced quickly and without the necessity of first removing the nozzle from the mold in which it is mounted.

It is a further object to provide an improved nozzle of this character which is so constructed as to permit a number of its components to be used with different types of molds, other components of the nozzle being interchangeable to accommodate different molds, thus allowing the manufacturer to reduce the inventory of nozzle parts.

It is also an object to provide an improved nozzle of this nature which will insure a more concentric mounting of the spreader member portion of the nozzle with respect to the body, thus resulting in a more uniform plastic flow.

It is another object to provide an improved nozzle of this character which minimizes the likelihood of cracks developing in the body due to heat expansion during operation.

Briefly, the injection molding nozzle of this invention comprises a shank housing, a shank extending forwardly from said housing, a bore in said shank, a heater in said bore having electrical leads, a body surrounding said shank and mounted on said shank housing, passageway means between said shank and body leading to an orifice at the forward end of said nozzle, passageway means in said shank housing leading to the passageway means between said shank and body, an end cap removably mounted on the rearward end of said shank housing and having passageway means leading to the shank housing passageway means, a heater access bore leading from the rearward end of said shank housing to said heater, and a lateral passage in said shank housing for the leads of said heater.

BRIEF DESCRIPTION OF THE DRAWINGS

FIG. 1 is a fragmentary cross-sectional view of a portion of an injection molding machine showing the mold cavity with the nozzle of this invention mounted in one of the dies, the nozzle being connected to a manifold.

FIG. 2 is an exploded view showing the components of the nozzle, the end cap however being of the type suitable for reception of the rounded end of an injection nozzle, and the body and shank being of a different size than those in FIG. 1 in order to illustrate the interchangeability feature of the invention;

FIG. 3 is a top plan view of the shank housing;

FIG. 4 is a cross-sectional view in elevation of the shank housing taken along the line 4—4 of FIG. 3;

FIG. 5 is a top plan view of the end cap; and

FIG. 6 is a top plan view of the heater retainer plug.

DESCRIPTION OF THE PREFERRED EMBODIMENT

The nozzle is generally indicated at 11 in FIG. 1 and is mounted in one of a pair of dies 12, 13 of a plastic injection molding machine. The arrangement is such that the discharge orifice 14 of the nozzle leads to cavity 15 between the dies. The nozzle is supplied with the plastic material, in FIG. 1, by a manifold shown partially at 16 although it is within the contemplation of the invention to supply the nozzle with the rounded end of a standard injection nozzle (not shown). The nozzle is disposed within a recess 17 of die 12 and a corresponding recess 18 of a cavity backup plate 19. In practice, a manufacturer will fabricate a specified number of parts using a particular mold assembly and will then use another mold assembly for different parts. The sizes of the dies and cavity backup plate may vary from mold to mold so that a different length or diameter of nozzle would be required for use with the new mold.

Nozzle 11 comprises a shank housing 21, a body 22 secured to the forward end of said housing, a shank or tip 23 within the body, a heater 24 disposed within the shank, a rear end cap 25 on the shank housing and a heater retaining plug 26 within the end cap.

The construction of shank housing 21 is best seen in FIGS. 1, 2 and 3. The housing is of rounded shape, having a number of spanner wrench holes 27 around its periphery. The rearward end 28 of the housing is internally threaded to receive the end cap 25 and the forward end has both an external thread 29 to receive the body and an internal thread 31 for mounting the shank or tip.

The central portion of shank body 21 is provided with a heater access bore 32 which receives heater 24, this bore extending between threaded portion 31 and another internally threaded portion 33 which receives heater retaining plug 26. A lateral passage 34 extends from bore 32 for the electrical heater leads 35.

A radial surface 36 is formed at the bottom of internally threaded recess 28, and a pair of axial passages 37 and 38 extend from surface 36 forwardly to the radial surface 39 at the forward end of the shank housing. These passages lead to the annular passage 41 between body 22 and shank 23, the latter passage leading to orifice 14.

Body 22 is of elongated shape, having an internally threaded rearward end 42 mounted on portion 29 of the shank housing. The enlarged portion of the body surrounding the thread 42 has axially extending ridges 43 for ease in grasping the body and also for lateral support when the body is mounted in the die. The main portion of body 22 has a plurality of circumferentially extending ridges 44. When the body is mounted in the die, these ridges will engage the die recess and support the body against expansion, minimizing the possibility of cracks which might otherwise occur due to the expansive effect of heat. Ridges 44 are provided with aligned notches 44a to allow for passage of air. A notch 44b in the face of body end 42 is aligned with notches 44a and with a groove 44c between ridges 43. The notches and groove constitute a venting arrangement allowing escape of air and therefore dissipation of heat from nozzle 11.

The forward portion 45 of the body is tapered in the conventional manner, leading to cylindrical exit portion 46, the forward surface of which is contiguous with the die surface at cavity 15.

Shank or tip 23 is of elongated shape and so dimensioned as to create annular passage 41 between the shank and body when the shank is mounted therewithin. The rearward end of the shank has an externally threaded portion 47 mounted within threaded portion 31 of the shank housing. It has been found that this threaded mounting arrangement is more apt to assure concentricity of the shank with respect to the body, as compared with the conventional silver-soldered method of assembly such as is shown, for example, in said U.S Pat. No. 3,010,155. The forward tapered end of 48 of shank 22 forms a spreader member portion leading to discharge orifice 14. A heater bore 49 is formed in shank 23, this bore being open toward the rearward end of the shank and contiguous with bore 32 of the shank housing.

Heater 24 is of conventional cylindrical shape and inserted within bores 32 and 49. Leads 35 of the heater extend through lateral passage 34. The relative dimensions of the bores are such that, when end cap 25 and heater retainer plug 26 are removed as described below, the heater may be withdrawn rearwardly from the shank housing through bore 32 and threaded portion 33, these openings being sufficiently large to permit the leads to be withdrawn as well as the heater itself. Similarly, a new heater may be inserted in the unit through these same openings with the leads 35 being passed through lateral openings 34 at the same time.

End cap 25 has an external thread 51 fitting within thread 28 of the shank housing. The forward portion of the end cap has a recess 52 and the rearward portion of the end cap shown in FIGS. 1 and 5 has a non-circular central opening 53 leading from the rear surface of the end cap to recess 52. The end cap shown in FIGS. 1 and 5 also has a flat surface 54 capable of entering into sealing engagement with the corresponding surface of manifold 16 so that the passage 55 in the manifold will feed molten plastic to passage 53. The non-circular nature of passage 53 will enable the end cap to be mounted in or removed from the shank housing. The size of recess 52 is such that the plastic material will be able to enter passages 37 and 38 of the shank housing.

An alternative end cap construction 125 is shown in FIG. 2, this end cap differing from that in FIGS. 1 and 5 only in that it has a concave surface 126 for receiving the rounded end of a direct injection machine nozzle rather than a manifold. Several different types of end caps 125 could be held in inventory having different curvatures 126. All the end caps would have the same outer threaded diameter so that they could be mounted alternatively in shank housing 21, and the size of recess 52 in all the end caps could also be the same.

Heater retaining plug 26 is shown in FIGS. 1, 2 and 6. This plug is of flared shape, having an externally threaded extension 56 for mounting in aperture 33 to retain heater 24 in place. The retainer plug rests against surface 36 of the shank housing, but the size of the retainer plug is small enough to allow an annular passage in recess 52 so permitting plastic flow to passages 37 and 38. The rearward end of the heater retainer plug has a wrench receiving extension 57 which again is sufficiently distant from recess 53 as to permit plastic flow.

The operation of the nozzle 11 will be apparent from the above description. Upon injection of molten plastic from passage 55 of the manifold, the plastic will flow through passage 53, recess 52, passages 37 and 38 and passage 41 to discharge orifice 14.

If it is desired to remove and replace heater 24, it is merely necessary, with the nozzle still in the die, to remove end cap 25 and then heater retaining plug 26. The heater may then be extracted rearwardly through the shank housing. The new heater may be inserted in the reverse direction with leads 35 extending through lateral passage 34.

If it is desired to reconstruct the nozzle as so to be suitable for mounting in another mold, the nozzle will be removed from die 12, and body 22 as well as shank 23 unscrewed from shank housing 21. The manufacturer may have in his inventory a selection of bodies and shanks of different sizes, but all having the same thread arrangement for mounting on the same shank housing 21. After properly selecting the new shank and body the manufacturer need merely screw them into place along with an appropriate heater 24. Thus there need only be one type of shank housing and one type of heater retaining plug. There will be two basic types of end caps available in inventory to accommodate the manifold and direct injection machine nozzle supplies. The result is a modular system which will reduce the overall inventory required by the manufacturer because of the interchangeability of components.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. An internally heated injection molding nozzle comprising body means having an inlet for plastic material at one end, a seat for a plastic material supply member around said inlet, and a discharge orifice for said material at the other end of said body means;
a shank in said body means;

a removable heater in said shank;

means forming a passage extending from said heater laterally through said body means through which electrical leads connected to said heater extend;

means in said body means forming an access opening forwardly of said inlet in a direction toward said discharge orifice through which the heater is removable from said one end of the body means;

means in said body means forming a passage for said plastic material extending from said inlet to said discharge orifice, a portion of said material passage extending around and being separate from said access opening and said lateral passage and another portion thereof being annular in form and separating said shank from said body means;

and removable means associated with said access opening separating said plastic material passage from said heater.

2. An injection molding nozzle as defined by claim 1 wherein said access opening is in communication with said lateral passage, whereby said electrical leads are insertable in and removable from said passage through said access opening.

3. An internally heated injection molding nozzle comprising a shank housing, a shank extending forwardly from said housing, a bore in said shank, a heater in said bore having electrical leads, a body surrounding said shank and mounted on said shank housing, passageway means between said shank and body leading to an orifice at the forward end of said nozzle, passageway means in said shank housing leading from the rearward end thereof to the passageway means between said shank and body, an end cap removably mounted on the rearward end of said shank housing and having passageway means leading from the rearward end of the end cap to the shank housing passageway means, a heater retaining plug mounted on the rearward end of said shank housing, said passageway means in the end cap comprising a recess within which said heater retaining plug is disposed, a heater access bore leading from the rearward end of said shank housing to said heater, said shank housing passageway means comprising at least one passage leading from said end cap recess alongside said heater access bore, and a lateral passage in said shank housing for the leads of said heater.

4. The combination according to claim 3, said end cap, heater retaining plug and body being threadably mounted on said shank housing, the shank housing having circumferentially spaced spanner-wrench apertures.

5. The combination according to claim 3, said shank housing passageway means comprising a pair of passages on opposite sides of said heater access bore.

6. The combination according to claim 3, said housing being further provided with venting passages on its exterior to permit the escape of air and dissipation of heat from the nozzle.

7. An injection molding nozzle comprising a shank housing having an externally threaded forward portion and an internally threaded rearward portion, a body threaded onto said forward portion, and internal thread on the forward end of said shank housing, a shank threadably mounted on said internal thread and extending within said body, an end cap threadably mounted on said threaded portion at the rearward end of said shank housing, an axial passage in said end cap for receiving molten plastic, a recess on the forward portion of said end cap, passageway means in said shank housing leading from said end cap recess to the forward end of the housing, passageway means formed between said shank and body and leading from said shank housing passageway means to the forward end of said nozzle, the forward end of said body being tapered, the forward end of said shank being tapered to form a spreader member portion of the nozzle, an axial bore in said shank, a heater within said bore, a lateral passage in said shank housing leading from said axial passage to accommodate heater leads, and a heater retaining plug mounted in the rearward end of said shank housing and disposed within said end cap recess, whereby said heater may be removed from said nozzle by first removing said end cap and then removing said heater retaining plug so that the heater may be extracted through said heater access bore and the rearward end of said nozzle.

8. A nozzle according to claim 7, further provided with a second body and a second shank having different lengths than said first-mentioned body and shank but also being mountable on said shank housing, whereby said shank and bodies may be interchanged for different mold sizes.

9. The combination according to claim 7, said cap being provided with means for connection to a supply manifold, and a second cap having means for receiving a spherical molding machine head, both end caps being mountable in said single shank housing whereby they may be interchanged.

10. The combination according to claim 7, said body being provided with a series of annular external rings whereby the body may be mounted in a mold and supported against excessive heat expansion by contact of said rings with said mold.

11. The combination according to claim 10, said rings being slotted, said slots forming part of a venting system on the exterior of said body to permit dissipation of heat from the nozzle.

12. The combination according to claim 7, said heater retainer plug being threadably mounted in said shank housing.

* * * * *